No. 739,564. Patented September 22, 1903.

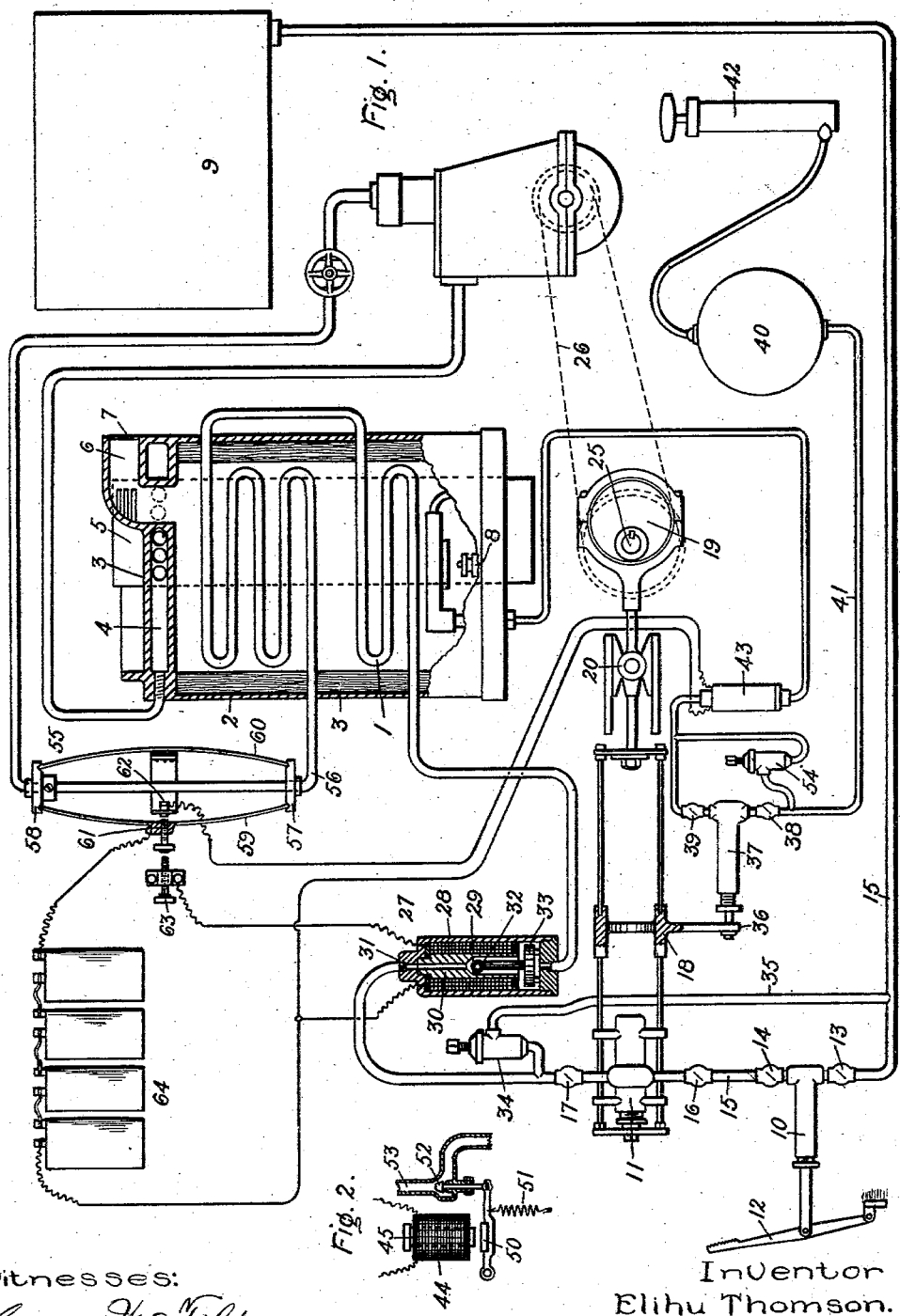

UNITED STATES PATENT OFFICE.

ELIHU THOMSON, OF SWAMPSCOTT, MASSACHUSETTS.

REGULATOR FOR VAPOR-GENERATORS.

SPECIFICATION forming part of Letters Patent No. 739,564, dated September 22, 1903.

Application filed October 31, 1902. Serial No. 129,531. (No model.)

*To all whom it may concern:*

Be it known that I, ELIHU THOMSON, a citizen of the United States, residing at Swampscott, county of Essex, State of Massachusetts, have invented certain new and useful Improvements in Regulators for Vapor-Generators, of which the following is a specification.

The present invention relates to vaporizer systems, and more especially to those of the flasher type designed to furnish superheated vapor.

The invention has for its object to provide an automatic regulator for vaporizers and their fire-chambers which will automatically maintain the temperature and pressure of the vapor under varying conditions of service by controlling the amounts of liquid and fuel which are supplied to the generator and fire-chamber, respectively, as the conditions of service change and the demand for vapor changes between wide limits, and this in an efficient and economical manner. In power systems wherein generators are employed of the flasher type capable of delivering superheated steam with fire-chambers using hydrocarbon fuel it is necessary for strictly economical operation to simultaneously supply liquid to the generator and fuel to the fire-chamber, and these in proportional amounts. By this I do not mean that for every given instant of time the supplies must bear an exact relation one to the other, for this is not necessarily so, since the supply of water may be momentarily decreased slightly, while that of the fuel is increased slightly, or vice versa. Such an arrangement or differential system will compensate very quickly for changes in temperature of the vapor delivered by the generator where a suitable regulator is employed. In the main, however, the amounts of water and fuel should vary correspondingly and in unison.

In carrying out my invention I utilize a heat-responsive device which acts on the fuel and water supplies and is itself governed by temperature changes—such, for example, as by changes in the temperature of the vapor delivered by the generator.

Automobiles as usually constructed have only a very limited amount of space in which the boiler, burner, engine, and other accessories must be placed, and it is difficult at times to properly arrange the regulating mechanism so that it will not be interfered with or be in the way. In order to overcome this objection, I propose to use electromagnetic motors or devices for regulating the said supplies, which motors or devices can be placed at the most convenient point or points and connected by a small flexible wire or wires with the thermostat previously referred to. A further advantage of this construction resides in the fact that the thermostat of itself can be made relatively small and delicate, so as to quickly respond to changes in temperature, while the magnetic motors or devices for operating the valves or equivalent devices can be made as powerful as is necessary.

In the accompanying drawings, which illustrate one embodiment of my invention, Figure 1 represents a generator of the flasher type, together with the regulator and necessary means for supplying fuel to the fire-chamber and water to the generator; and Fig. 2 is a detail diagrammatic view showing the nature of the electromagnetically-actuated valve for either the fuel or water supply.

Referring to Fig. 1, 1 represents a generator of the flasher type, which comprises a coil of pipe bent back and forth on itself in such a way as to occupy a relatively small space. The coils of the generator have been shown as separated; but it is to be understood that the particular structure is only illustrative.

In order for the generator to perform its work properly, it should present an extended surface to the fire, and the arrangement of coils should be such that the incoming liquid is gradually heated to the point of vaporization, after which it is superheated to a predetermined degree. As the demand for superheated steam or other vapor changes the point in the generator where the liquid is vaporized shifts more or less toward or away from a given end. Under average conditions the vaporization may be said to take place about midway between the ends of the tube; but for other conditions of service or requirements it may take place before or after this point is reached. A generator constructed on these lines will furnish superheated vapor at the proper pressure and temperature when the fire is properly controlled. The coils or tubes of which the generator is composed should be so arranged or bent that they occupy a relatively small space, and, furthermore, the various tubes should be so placed with respect to each other that they will readily abstract heat from the fire-gases.

Surrounding the generator tube or tubes is a metallic casing 2, and between the casing and the tube or tubes is a lining 3, of asbestos or some similar non-conducting material. The top of the casing is closed by a cover containing a chamber 4, into which the exhaust from the engine is discharged. This chamber communicates with a downwardly-opening flue 5, which is employed to create a forced downdraft. The exhaust-steam prior to being discharged into the downwardly-opening flue is reheated, so as to be rendered invisible under ordinary climatic conditions. The passage of the exhaust-steam when the system is in operation materially increases the draft on the fire-chamber, and hence is useful in the economic production of high-tension vapor. The cover is also provided with a flue-opening 6, having a screen 7, through which flue the products of combustion pass when the system is standing still or using little or no steam. Situated below the boiler is a fire-chamber containing a burner 8, of suitable construction, designed for hydrocarbon fuel—such as gasolene or kerosene, for example. I desire to have it understood that my invention is not limited to the particular structure of the generators shown nor to the particular type of burner, since these can be varied without departing from my invention. Water or other liquid for the generator is supplied by the tank 9, and between the tank and the generator are two pumps 10 and 11. The pump 10 is designed to be operated manually either by a foot or hand lever 12 for the purpose of starting. It is provided with a suction-valve 13 and a delivery-valve 14, and the valves are so constructed and arranged that when the power-pump 11 is operated they will permit water to flow from the tank to the power-pump. The bodies of the hand and power pumps are stationary, and the latter is connected to the supply-pipe 15 through a suction-valve 16. On the opposite side of the pump is a delivery-valve 17, which prevents the return of water or other liquid from the generator. The piston of the power-pump is connected to the frame 18, and the latter is driven by an eccentric 19 through the crosshead 20, the latter being suitably guided.

The capacity of the pump should be great enough to supply the necessary water under ordinary maximum running conditions and to maintain a pressure great enough to prevent the water from entering the spheroidal state. For exceptional overloads the hand or foot pump 10 can be employed to assist the power-pump. The eccentric is mounted on a shaft 25, which may be the axle of a vehicle when the apparatus is mounted thereon, or it can be an independent shaft and driven directly from the engine, as indicated by the driving connection 26. (Shown in dotted lines.) In series with the water-pumps is a magnetically-actuated valve 27, comprising in the present instance a shell 28, a magnet-winding 29, and a fixed core 30. The core 30 is provided with an opening or conduit 31, which communicates with the pipe from the power-pump. The lower end of the core is provided with a conical valve-seat, which is adapted to receive the ball 32, the latter being made out of steel or other magnetic material. Situated below the winding and core and in a position to be acted upon thereby is an armature 33. This armature is provided with an upwardly-extending projection, which engages with the under surface of the ball 32, and when the magnet is energized it forces the ball against the conical seat in the core and shuts off the supply of water or other liquid to the generator. The circuit of the magnet is controlled in a manner to be hereinafter described. In order to provide a relief for the water-pumps when the electromagnetically-actuated valve is closed, an adjustable by-pass valve 34 is provided, which is connected by a pipe 35 around the pumps 10 and 11.

Secured to the frame 18 is an extension 36, which carries the piston of the fuel-pump 37. The body of the pump is stationary, and as the piston moves in and out under the action of the eccentric the fuel is supplied to the fire-chamber in proper amounts. The capacities of the power water-pump 11 and of the fuel-pump 37 bear a definite relation with respect to each other, and water and fuel will be delivered by them in proper amounts for producing superheated steam by the generator at the proper temperature and pressure. The pumps being connected to the engine or to the axle of the vehicle, the speed of the pumps will be varied as the speed of the engine changes, and the regulator will insure the proper amounts of fuel and water being delivered to the fire-chamber and generator. In other words, the supplies of water and fuel are properly correlated to furnish steam under ideal conditions. The fuel-pump is provided with a suction-valve 38 and a delivery-valve 39 and is connected with the fuel-tank 40 by means of the pipe 41. The fuel-tank is designed to be placed under an initial air-pressure by the manually-actuated air-pump 42 for the purpose of starting. The fuel-pump being placed in series between the tank 40 and the fire-chamber, fuel will be supplied to the latter under the desired pressure. I have found that with the pressure varying from forty to fifty pounds satisfactory results can be obtained. In series relation with the pump and the burner is an electrically-actuated valve 43 of the same general character as that previously described in connection with the water-service.

For the purpose of illustration I have shown diagrammatically in Fig. 2 a magnetically-actuated valve which may be considered as being typical of any electromagnetically-actuated valve suitable for the purposes described. The present one comprises a magnet 44, having a suitable core 45. Situated below the core and in a position to be acted upon by it is an armature 50, that is attached to a lever which actuates the valve. Opposing the action of the magnet and its core is a spring 51, which normally tends to open the valve 52, the latter being situated within the pipe 53 and the said pipe being provided with a suitable seat. When the magnet is energized, the valve is closed, and when the magnet is deenergized the spring 51, aided by the weight of the moving parts, tends to open the valve.

In order to relieve the fuel-pump 37 when for any reason the magnetically-actuated valve 43 is closed, an adjustable by-pass valve 54 is provided, which is connected around the fuel-pump in a manner to form a shunt, so that even though the pump continues to operate the fuel will not enter the burner, but will flow in a local circuit.

In order to control the generation of the superheated steam, a thermostat 55 is provided, the one shown being typical, and its construction may be varied to suit the particular conditions of service for which it is intended. In the present instance superheated steam or other vapor is delivered by the pipe 56, and mounted on the pipe at suitable points are clamps 57 and 58, the latter being made movable for the purpose of adjustment. The ends of the clamps are provided with notches to receive the flat springs 59 and 60. Mounted on the spring 59 is a contact 61, which has two operative positions, and mounted on the spring 60 is a contact 62. Situated adjacent to and in line with the contact 61 is a stationary adjustable contact 63. The springs 59 and 60 are situated far enough from the pipe 56 so that they are not appreciably affected by its temperature, and as the section of pipe between the clamps 57 and 58 expands or contracts it imparts movement to the springs 59 and 60, and consequently closes the circuit between the adjustable contacts 61 and 62 or between the contacts 61 and 63. As an additional precaution the pipe 56 may be lagged to prevent it from affecting the spring by radiation. As the pipe 59 expands, due to the increased temperature of the steam caused by an increased temperature of the fire-gases or to the decrease in the demand for superheated steam, the contacts 61 and 62 complete the circuit through the fuel-controlling valve 43 and the battery 64 or other source of energy. When the valve 43 is closed, it shuts off all or a large portion of the supply of fuel to the fire-chamber. I have found it desirable to leave a small passage in the valve, so that sufficient fuel will flow to the fire-chamber to keep the burner from going out. When the valve 43 is closed and the power fuel-pump continues its operation, the relief-valve 54 will open and permit the excess fuel to be by-passed around the pump. Assuming, on the other hand, that the temperature of the steam decreases to a predetermined point that portion of the pipe 56 between the ends of the thermostat will contract, which contraction will cause the contact 61 to engage with the contact 63 and close the circuit of the electromagnetically-actuated valve 47, that regulates the water-supply. When this action takes place, the supply of water or other liquid to the generator is interrupted, and the water delivered by the power-pump 11 or the manually-actuated pump 10, or both, will be by-passed through the relief-valve 34. From the foregoing it will be seen that the control of the steam is directly under the thermostat and that as the temperature of the steam varies the supply of fuel and water will be correspondingly varied.

The details of construction of the fuel and water pumping apparatus can be widely varied, while the heat-responsive device is typical of a contact mechanism that is responsive to temperature changes and more particularly to those in the steam delivered. The apparatus insures the delivery of superheated vapor by doing either one of two things, viz.: When the steam is too cold, it puts on the full burner effect, and when the steam is too hot it cuts off virtually or in part the supply of fuel to the fire-chamber. Furthermore, it cuts off the supply of liquid to the generator when the vapor is too cool and renews the supply when the vapor is too hot. What is really accomplished in practice is to decrease the supply of water and increase the burner effect when the vapor is too cool, due to the demand of the engine, and increase the water-supply and cut down the burner effect when the vapor is too hot. Both of these changes take place in substantial unison with the demand for energy by the engine, and the change in amount of fluids delivered accords with the magnitude of the change in demand for vapor energy. As the demand for energy increases the supplies of liquid and fuel are increased in substantial unison and in substantially proportional amounts, and as the demand is reduced a corresponding reduction takes place, thereby preserving a high economy at all times. The prime object is to maintain and supply the engine with vapor superheated to an approximately definite degree and at a predetermined pressure. The organization as a whole is so constructed and arranged that it is capable of supplying the necessary amount of vapor for varying conditions of load, such as occur in automobile service, where at one time the load is nothing, or practically so, and the next instant is at a maximum, due to road conditions or load, or both. As the load changes the amounts of fuel and water are correspondingly and simultaneously changed in accordance therewith, and by reason of these changes in supplies the superheated vapor is maintained at a given pressure and temperature at all times. It is also to be observed that a safeguard is provided, so that the generator cannot be overheated, and thereby injured, as well as causing injury to the engine and other parts associated therewith. The magnetically-actuated valves, owing to their construction, can be placed at any suitable point on the vehicle, and so can the thermostat for the same reason. The wires connecting the various parts are well insulated and, being flexible, can be distributed or arranged as best suits the requirements.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a system of regulation, the combination of a generator, an engine, a fire-chamber, means for supplying liquid to the generator and fuel to the fire-chamber, a thermostatic regulator, and electromagnetic means controlled by the regulator for regulating the supplies of liquid and fuel.

2. In a system of regulation, the combination of a generator arranged to deliver superheated vapor, an engine, a fire-chamber, means tending to deliver liquid to the generator in substantial unison with the variations in demand for superheated vapor, means tending to deliver fuel to the fire-chamber in substantial unison with the demand for heat, electromagnetic devices regulating the action of both of said means, and a thermostat acted upon by temperature changes for controlling the electromagnetic devices.

3. In a system of regulation, the combination of a generator, an engine, a means for conveying vaporizable liquid to the generator, a fire-chamber, a means for conveying fuel to the chamber, a valve regulating the admission of liquid to the boiler, a means regulating the admission of fuel to the fire-chamber, electromagnetic devices controlling the valve and fuel-regulating means, and a thermostat for regulating the said magnetic means.

4. In a system of regulation, the combination of an engine, a boiler, a fire-chamber, a liquid-supply for the boiler, a fuel-supply for the fire-chamber, a thermostat, and an electromagnetic means controlled by the thermostat for regulating the supply of fuel to the fire-chamber.

5. In a system of regulation, the combination of an engine, a generator arranged to deliver superheated vapor, a fire-chamber arranged in operative relation thereto, a means tending to deliver liquid to the boiler in substantial unison with the demand for superheated vapor, a pump tending to deliver liquid fuel to the fire-chamber in substantial unison with the demand for heat, a thermostat, and an electromagnetic device controlled by the thermostat for regulating the effective delivery of the pump.

6. In a system of regulation, the combination of an engine, a generator arranged to deliver superheated vapor, a fire-chamber arranged in coöperative relation thereto, a means tending to deliver liquid to the boiler in substantial unison with the demand for superheated vapor, a pump tending to deliver liquid fuel to the fire-chamber in substantial unison with the demand for heat, a thermostat, and an electromagnetically-actuated valve which is situated in the connection between the pump and the fire-chamber and is controlled by the thermostat, for regulating the effective delivery of the pump.

7. In a system of regulation, the combination of a boiler, a pump for supplying water to the boiler, a fire-chamber, a pump for supplying liquid fuel to the fire-chamber, an engine driving both pumps, electromagnetic means for controlling the effective discharge of the pumps, and thermostatic means which regulate the action of the electromagnetic means.

8. In a system of regulation, the combination of a vaporizer designed to deliver superheated vapor, a fire-chamber for heating the vaporizer, electromagnetic means for regulating the temperature and pressure of the vapor delivered by the vaporizer by controlling the water supplied to the vaporizer and the admission of fuel to the fire-chamber, and a thermostat for controlling said electromagnetic means alternatively.

9. In combination, a generator designed to deliver superheated vapor, a pump tending to deliver liquid to the generator in amounts varying in substantial unison with the demand for vapor, an electrically-controlled valve for varying the effective delivery of the pump, a fire-chamber, a pump tending to deliver liquid fuel to the fire-chamber in substantial unison with the demand for heat, an electrically-controlled valve for varying the effective delivery of the fuel-pump, and a single means for regulating the action of both valves alternatively.

10. In combination, a generator capable of delivering superheated vapor, a fire-chamber therefor, electromagnetic means for regulating the temperature of the vapor delivered by the generator, electromagnetic means for regulating the pressure of the vapor, and a thermostat acted upon by the vapor for controlling the electromagnetic means alternatively.

11. In combination, a generator, a fire-chamber, a magnetic means for controlling the supply of liquid to the generator, a magnetic device for controlling the supply of fuel to the fire-chamber, and a heat-responsive means which controls the said means and device alternatively.

12. In combination, a generator arranged to deliver superheated vapor, a fire-chamber in operative relation with respect to the generator, a pump tending to supply liquid to the generator, a second pump tending to supply fuel to the fire-chamber, a thermostat acted upon by the superheated vapor delivered by the generator, and electromagnetic means acting under the control of the thermostat tending to vary the supplies of liquid and fuel in substantial unison with the demand for superheated vapor, and this in a proportional manner.

13. In combination, a boiler, a fire-chamber, a pump for delivering water to the boiler, a pump for delivering liquid fuel to the fire-chamber, an engine for driving both pumps, an automatic relief mechanism for the water-pump, a magnetically-controlled valve for governing the admission of water to the boiler, a thermostat, a source of electrical energy, and a contact controlled by the thermostat for making and breaking the circuit of the magnet.

14. In combination, a generator capable of delivering superheated vapor, a fire-chamber, a pump for supplying liquid to the generator, a pump for supplying fuel to the fire-chamber, an engine for driving both pumps, and a thermostat for controlling the effective capacity of the pumps.

15. In a system of regulation, the combination of a generator arranged to deliver superheated steam, an engine operatively connected therewith, a fire-chamber for the generator, water and fuel pumps the capacities of which bear a definite relation to each other, a driving connection which is common to both pumps, electromagnetic means for controlling the effective capacities of the pumps, a source of electric energy, and a heat-responsive device for regulating the action of the magnets.

16. In combination, a generator capable of delivering superheated vapor, a means working under pressure for delivering fluid to the generator, a relief mechanism for said means, a fire-chamber, means working under pressure for delivering fluid to the chamber, a relief mechanism for said fuel means, and a thermostat for varying the effective supplies of liquid to the generator and fuel to the fire-chamber.

In witness whereof I have hereunto set my hand this 29th day of October, 1902.

ELIHU THOMSON.

Witnesses:
 DUGALD McK. McKILLOP,
 JOHN J. WALKER.